(12) United States Patent
Song et al.

(10) Patent No.: US 10,663,640 B2
(45) Date of Patent: May 26, 2020

(54) LIGHT GUIDE PLATE AND LIQUID CRYSTAL DISPLAY COMPRISING THE SAME

(71) Applicant: LG DISPLAY CO., LTD, Seoul (KR)

(72) Inventors: Youngki Song, Paju-si (KR); Hyunkyo Lim, Paju-si (KR); Sunbok Song, Ansan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 3 days.

(21) Appl. No.: 15/833,840

(22) Filed: Dec. 6, 2017

(65) Prior Publication Data

US 2018/0156964 A1 Jun. 7, 2018

(30) Foreign Application Priority Data

Dec. 7, 2016 (KR) ........................ 10-2016-0165882

(51) Int. Cl.
| | |
|---|---|
| *G02B 6/00* | (2006.01) |
| *F21V 8/00* | (2006.01) |
| *G02F 1/1368* | (2006.01) |
| *G02F 1/1362* | (2006.01) |
| *G02F 1/133* | (2006.01) |
| *G02F 1/1335* | (2006.01) |
| *G02F 1/1343* | (2006.01) |

(Continued)

(52) U.S. Cl.
CPC .......... *G02B 6/0045* (2013.01); *G02B 6/0011* (2013.01); *G02B 6/0053* (2013.01); *G02F 1/1368* (2013.01); *G02F 1/13306* (2013.01); *G02F 1/133308* (2013.01); *G02F 1/133528* (2013.01); *G02F 1/134309* (2013.01); *G02F 1/136286* (2013.01); *G02B 6/0051* (2013.01); *G02B 6/0055* (2013.01); *G02B 6/0061* (2013.01); *G02B 6/0088* (2013.01); *G02F 1/1337* (2013.01); *G02F 2001/133317* (2013.01); *G02F 2001/136222* (2013.01); *G02F 2201/121* (2013.01); *G02F 2201/123* (2013.01); *G02F 2201/56* (2013.01); *G09G 3/3677* (2013.01); *G09G 3/3688* (2013.01); *G09G 2310/027* (2013.01); *G09G 2310/08* (2013.01); *G09G 2320/0673* (2013.01); *G09G 2352/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,921,651 | A * | 7/1999 | Ishikawa | G02B 6/0065 362/23.15 |
| 7,207,708 | B2 * | 4/2007 | Tanaka | G02B 6/0036 362/619 |

(Continued)

FOREIGN PATENT DOCUMENTS

| | | |
|---|---|---|
| CN | 202907072 U | 4/2013 |
| CN | 105431753 A | 3/2016 |

*Primary Examiner* — Daniel A Hess
(74) *Attorney, Agent, or Firm* — Seed IP Law Group LLP

(57) ABSTRACT

A light guide plate and a liquid crystal display are disclosed. The light guide plate having a light incident plane on which light is incident from a light source and a reverse light incident plane facing the light incident plane, includes at least one of corners of the reverse light incident plane having a curvature, a chamfered shape, or a plurality of first step patterns including a first tread and a first riser.

17 Claims, 16 Drawing Sheets

(51) Int. Cl.
 *G02F 1/1333* (2006.01)
 *G02F 1/1337* (2006.01)
 *G09G 3/36* (2006.01)

(56) References Cited

U.S. PATENT DOCUMENTS

| | | | |
|---|---|---|---|
| 2010/0271568 A1* | 10/2010 | Jung | G02F 1/133608 349/65 |
| 2016/0161664 A1* | 6/2016 | Ishida | G02B 6/0045 359/230 |
| 2018/0210279 A1* | 7/2018 | Baek | G02F 1/133512 |
| 2019/0086604 A1* | 3/2019 | Yasunaga | G02B 6/00 |

* cited by examiner

| Test | First Embodiment | Second Embodiment |
|---|---|---|
| Ray Tracing |  |  |
| Simulation |  |  |

(a)

(b)

| Test | Comparative example | Modified example |
|---|---|---|
| Ray Tracing |  |  |
| Simulation |  |  |

LIGHT GUIDE PLATE AND LIQUID CRYSTAL DISPLAY COMPRISING THE SAME

CROSS-REFERENCE TO RELATED APPLICATION

This application claims the priority benefit of Korean Patent Application No. 10-2016-0165882 filed on Dec. 7, 2016, which is incorporated herein by reference for all purposes as if fully set forth herein.

BACKGROUND

Technical Field

The present disclosure relates to a light guide plate and a liquid crystal display comprising the same.

Description of the Related Art

Various flat panel display devices such as a liquid crystal display (LCD), an organic light emitting diode (OLED) display, a plasma display panel (PDP) and an electrophoretic display (EPD) device have been developed. The liquid crystal display displays an image by controlling an electric field applied to liquid crystal molecules depending on a data voltage. A thin film transistor (hereinafter, referred to as TFT) is formed for each pixel in a liquid crystal display of an active matrix driving type.

The liquid crystal display includes a display panel, a backlight unit for illuminating the display panel with light, a source driver integrated circuit (IC) for supplying a data voltage to the data lines of the display panel, a gate driver IC for supplying gate pulses (or scan pulses) to the gate lines (or scan lines) of the display panel, a controller for controlling the ICs, a light source driver for driving a light source of the backlight unit, and the like.

BRIEF SUMMARY

An object of the present disclosure is to provide a light guide plate having irregular shape and a liquid crystal display comprising the same. In particular, in one embodiment, the light guide plate may have stepped edges at the two upper corners that on the side opposite to the side of the light source.

In one aspect, a light guide plate and a liquid crystal display are disclosed. The light guide plate having a light incident plane on which light is incident from a light source and a reverse light incident plane facing the light incident plane, includes at least one of corners of the reverse light incident plane having a curvature, a chamfered shape, or a plurality of first step patterns including a first tread and a first riser.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the disclosure. In describing various embodiments, the same components may be described at the outset and may be omitted in other embodiments.

Figure 1:
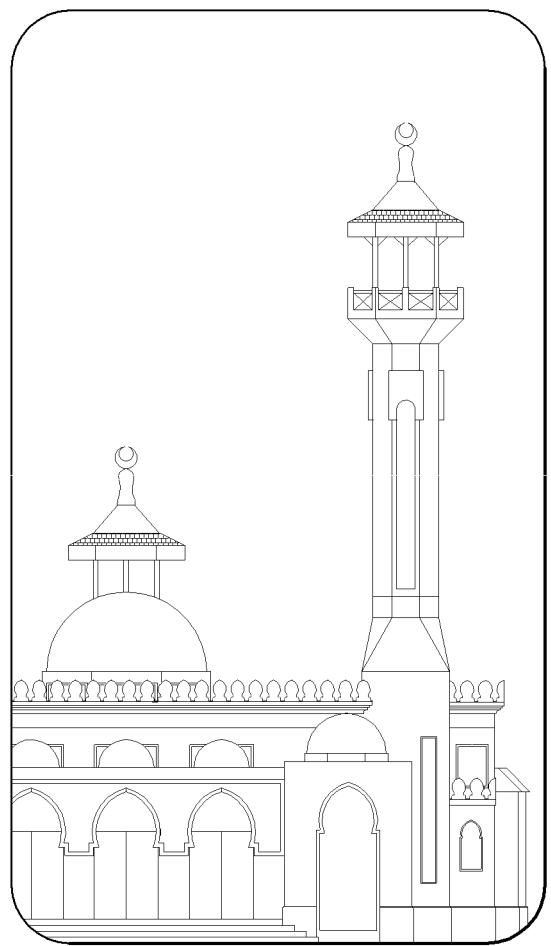
FIGS. 1 and 2 are views schematically illustrating a liquid crystal display according to an embodiment of the disclosure.
Figure 2:
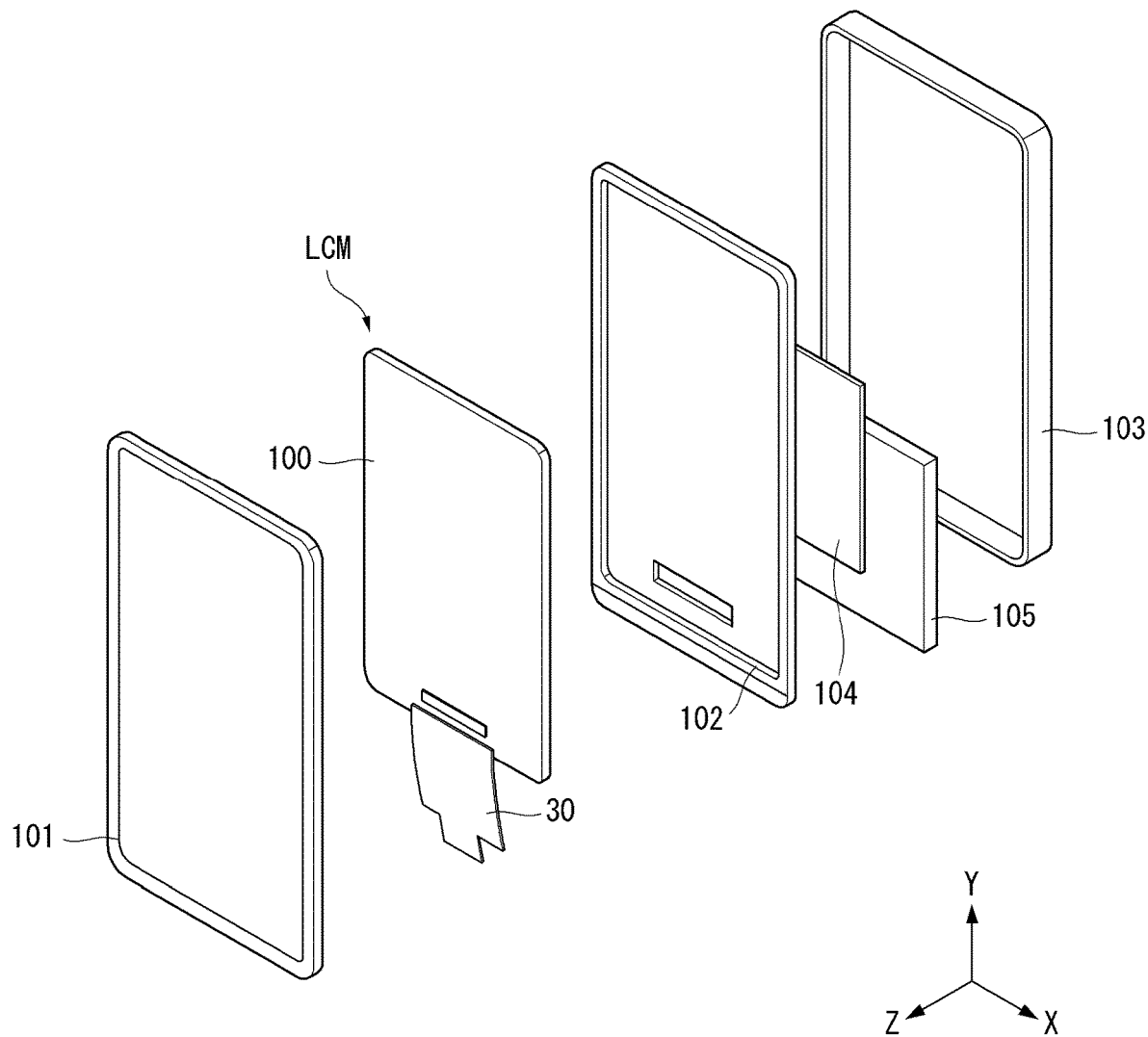

FIGS. 1 and 2 are views schematically illustrating a liquid crystal display according to an embodiment of the disclosure. The liquid crystal display according to an embodiment of the disclosure may include a sensor, such as a touch sensor for sensing at least one of a touch input, a gesture input, and a posture input of a user. The liquid crystal display according to an embodiment of the disclosure may be implemented as a transmissive type display device, a reflective type display device, and the like, but is not limited thereto.

Referring to FIGS. 1 and 2, the liquid crystal display of the disclosure may include a liquid crystal module LCM, a front cover 101, a back cover 103, a main board 104, and the like. Here, the cover may be represented by a case or a housing.

The liquid crystal module LCM includes a display panel 100 and a display panel driving circuit. Sensors such as touch sensors may be arranged on an entire screen of the display panel 100. The display panel driving circuit includes a source driver IC (SIC) 46 (shown in FIG. 3) and a flexible circuit board 30 connecting the source driver IC 46 to the main board 104. The display panel driving circuit further includes a gate driver IC (GIC) 40 shown in FIG. 3.

The front cover 101 is located on a front surface of the liquid crystal module LCM and covers a part of an edge of the liquid crystal module LCM. The user can view an input image through the front surface of the exposed liquid crystal module LCM.

The back cover 103 is located on a back surface of the liquid crystal module LCM. A camera and various sensors may be disposed between the liquid crystal module LCM and the back cover 103. The sensors include various sensors applicable to liquid crystal display, for example, proximity sensors, gyro sensors, geomagnetic sensors, motion sensors, illuminance sensors, RGB sensors, hall sensors, temperature/humidity sensors, heart rate sensors, fingerprint sensors, and the like.

The liquid crystal module LCM and the main board 104 may be disposed in an internal space provided between the front cover 101 and the back cover 103. The internal space may further include a battery 105 for supplying power to the liquid crystal module LCM.

The internal space may further include a mid frame 102. The mid frame 102 supports the liquid crystal module LCM and can spatially separate the liquid crystal module LCM from the main board 104. The flexible circuit board 30 may be connected to the main board 104 through a slot of the mid frame 102.

An audio/video (A/V) input unit, a user input unit, a speaker, a microphone, and the like may be provided on the front cover 101 and the back cover 103. The A/V input unit, the user input unit, the speaker, and the microphone may be connected to the main board 104. The user input unit may include a touch key pad, a dome switch, a touch pad, a jog wheel, a jog switch, and the like.

Figure 3:
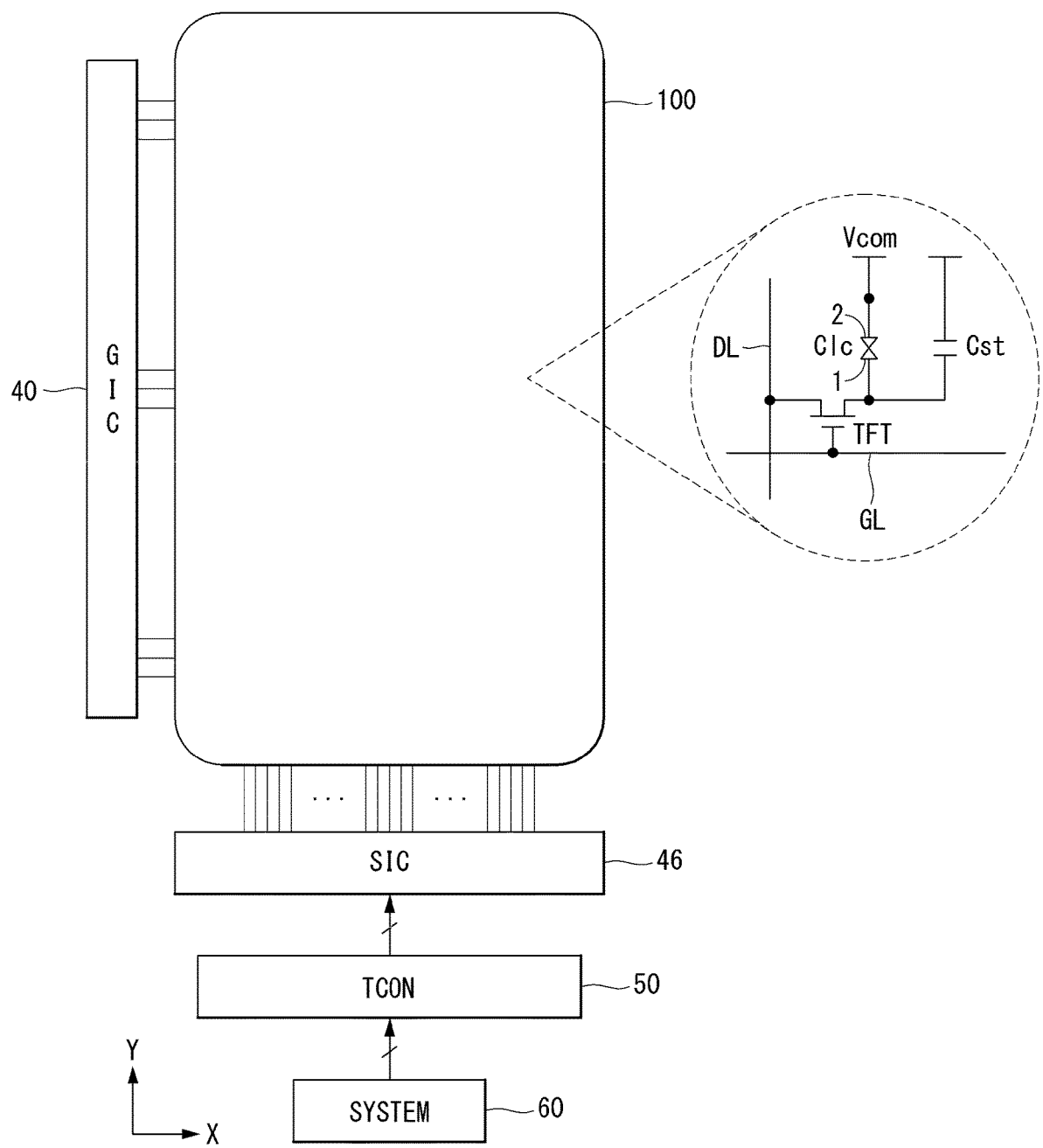
FIG. 3 is a block diagram schematically illustrating a liquid crystal module according to an embodiment of the disclosure.

Circuits of a host system 60 (FIG. 3) are mounted in the main board 104. The host system 60 (FIG. 3) includes a display module, a wireless communication module, a short distance communication module, a mobile communication module, a broadcast receiving module, an A/V input portion, a global position system (GPS) module, a power supply circuit, and the like. The user input unit, the speaker, the microphone, the battery 105, and the like are connected to the host system 60 (FIG. 3). The power supply circuit removes noise from a voltage of the battery 105 and supplies it to the host system 60 (FIG. 3) and a module power supply of the display panel driving circuit.

In the drawing, an instance in which the liquid crystal display is a mobile device is illustrated as an example, but the embodiment of the disclosure is not limited thereto. For example, the liquid crystal display according to an embodiment of the disclosure may be implemented as a television (TV) system, a set-top box, a navigation system, a DVD player, a Blu-ray player, a personal computer (PC), a home theater system, or the like.

Figure 4:
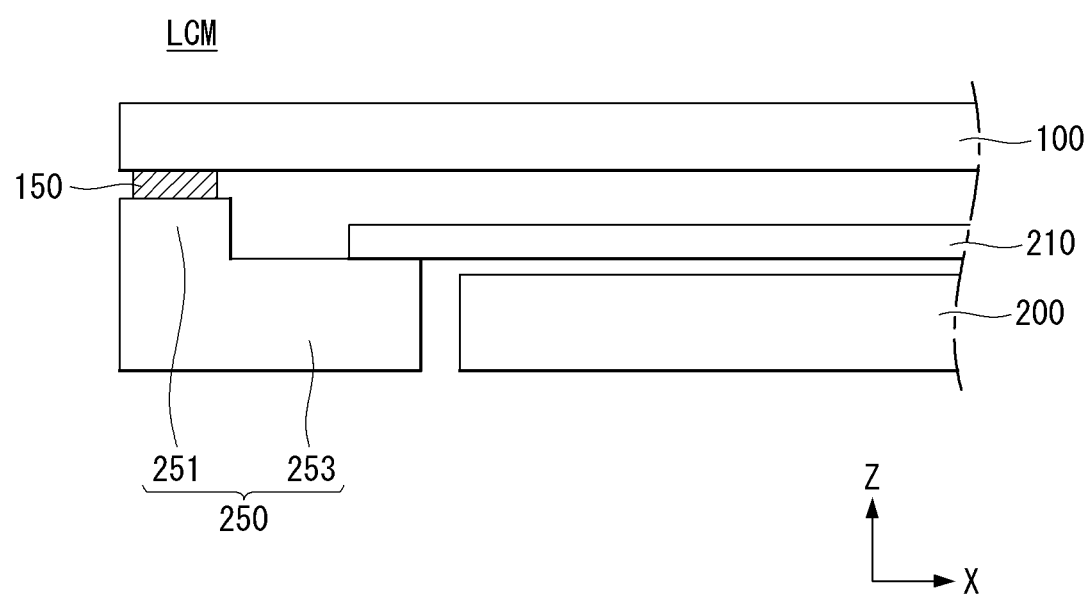
FIG. 4 is a view illustrating a schematic arrangement example of a liquid crystal module according to an embodiment of the disclosure.

FIG. 3 is a block diagram schematically illustrating a liquid crystal module according to an embodiment of the disclosure. FIG. 4 is a view illustrating a schematic arrangement example of a liquid crystal module according to an embodiment of the disclosure.

Referring to FIG. 3, a liquid crystal module according to an embodiment of the disclosure includes a display panel 100, a driver integrated circuit (IC), a timing controller (TCON) 50, and the like.

The display panel 100 includes an upper substrate and a lower substrate facing each other with a liquid crystal cell Clc therebetween. The display panel 100 includes a pixel array in which a plurality of pixels are arranged. The pixel array may be defined as an area in which an input image is displayed.

The pixel array includes a thin film transistor (hereinafter, referred to as "TFT") array formed on the lower substrate and a color filter array formed on the upper substrate. Using a color filter on TFT (COT) or a TFT on color filter (TOC) process, the color filter can be formed on the TFT array of the lower substrate.

The TFT array includes data lines DL and gate lines GL. The data lines DL are formed along a first direction (e.g., a y-axis direction). A data voltage is applied to the data lines DL. The gate lines GL are formed along a second direction (e.g., an x-axis direction) that intersects with the first direction. A gate pulse is applied to the gate lines GL.

In the TFT array, TFTs are formed at an intersections of the data lines DL and the gate lines GL. The TFT supplies the data voltage from the data line DL to a pixel electrode 1 of the liquid crystal cell Clc in response to the gate pulse from the gate line GL. Each of the liquid crystal cells Clc is driven by a voltage difference between the pixel electrode 1 for charging the data voltage through the TFT and a common electrode 2 to which a common voltage Vcom is applied. A storage capacitor Cst for holding a voltage of the liquid crystal cell Clc for one frame period is connected to the liquid crystal cell Clc. polarizing plates are respectively attached to the upper substrate and the lower substrate of the display panel 100. Alignment films for setting a pre-tilt angle of the liquid crystals are respectively formed on the upper substrate and the lower substrate of the display panel 100.

The driver IC is a driving circuit of the display panel 100 including a source driver IC (SIC) 46 and a gate driver IC (GIC) 40. The source driver IC 46 and the gate driver IC 40 may be mounted on a flexible circuit board such as a chip on film (COF). An input terminal of the flexible circuit board may be connected to a main board, and an output terminal of the flexible circuit board may be connected to the display panel 100. The output terminal of the flexible circuit board may be bonded to the lower substrate of the display panel 100 through an anisotropic conductive film. As another example, the gate driver IC 40 may be disposed directly on the display panel 100 using a gate-driver in panel (GIP) circuit manner.

The source driver IC 46 samples digital video data of the input image under a control of the timing controller 50, latches the digital video data, and converts the digital video data into data of a parallel data system. The source driver IC 46 converts the digital video data into an analog gamma compensation voltage by using a digital-to-analog converter (DAC) under the control of the timing controller 50 to generate data voltages, and supplies the data voltages to the data lines DL. The gate driver IC 40 sequentially supplies gate pulses (or scan pulses) synchronized with the data voltages from a first gate line to an n-th gate line under the control of the timing controller 50.

The timing controller 50 transmits the digital video data of the input image received from a host system 60 to the source driver ICs 46. The timing controller 50 receives timing signals such as a vertical synchronization signal Vsync, a horizontal synchronization signal Hsync, a data enable signal DE and a main clock MCLK from the host system 60. These timing signals are synchronized with the digital video data of the input image. The timing controller 50 generates a source timing control signal for controlling an operation timing of the source driver ICs 46 and a gate timing control signal for controlling an operation timing of the gate driver ICs 40 using the timing signals Vsync, Hsync, DE, and MCLK.

The host system 60 converts the digital video data RGB of the input image into a format suitable for the display panel 100. The host system 60 transmits the timing signals (Vsync, Hsync, DE, MCLK) to the timing controller 50 together with the digital video data of the input image.

Referring to FIG. 4, a liquid crystal module LCM according to an embodiment of the disclosure includes a display panel 100 and a backlight unit. The display panel 100 and the backlight unit are assembled together with a case member such as a guide panel (GP), and are implemented as the liquid crystal module LCM.

The display panel 100 includes an upper substrate, a lower substrate, and a liquid crystal layer interposed between the upper substrate and the lower substrate, as described above. The liquid crystal layer may be implemented as at least one of various liquid crystal modes.

A polarizing film may be provided on a front surface or a back surface of the display panel 100. The polarizing film is provided on at least one of the front surface and the back surface of the display panel 100 to pass only components of a specific polarization direction among components of light emitted from the backlight unit.

The backlight unit is provided under the display panel 100, and emits light toward the back surface of the display panel 100. The backlight unit includes a light source 205 (FIG. 6), a light guide plate 200, and at least one optical sheet 210. Light supplied from the light source 205 (FIG. 6) to a light incident plane of the light guide plate 200 is converted into a surface light source form and is emitted to a front surface of the light guide plate 200, and is uniformly irradiated onto the back surface of the display panel 100 while passing through the optical sheet 210 positioned above the light guide plate 200.

The light source 205 (FIG. 6) may be one of lamps such as a light emitting diode (LED), a cold cathode fluorescent lamp (CCFL), and an external electrode fluorescent lamp (EEFL). The light source 205 (FIG. 6) is positioned opposite at least one side (i.e., the light incident plane) of the light guide plate 200 and irradiate light onto the light incident plane. The light guide plate 200 is a plate formed of transparent plastic, for example, polymethly methacrylate (PMMA), and serves to convert light of a point light source form or a line light source form into light of a surface light source form.

The optical sheets 210 include one or more prism sheet and one or more diffuser sheet to diffuse light incident from the light guide plate 200 and refract a path of light toward the display panel 100.

A reflective sheet may further be provided under the light guide plate 200 to enhance efficiency of light incident on the display panel 100 by reflecting light provided from the light guide plate 200.

A guide panel 250 may be formed in an "L" shape of a cross section which has at least one bend. The guide panel 250 includes a first body 251 and a second body 253. The first body 251 supports an edge of the display panel 100 from below. The second body 253 extends from one end of the first body 251 and is disposed to surround the light guide plate 200.

The first body 251 and the second body 253 have a step difference. The second body 253 supports an edge of the optical sheet 210 from below. The display panel 100 and the optical sheet 210 are spaced apart from each other by the step difference between the first body 251 and the second body 253. A distance between the optical sheet 210 and the light guide plate 200 may be kept constant by the second body 253. A distance between the display panel 100 and the optical sheet 210 and a distance between the optical sheet 210 and the light guide plate 200 can be appropriately selected considering the optical characteristics.

The guide panel 250 may have a frame shape passing through a center. As will be described later, it is preferable that the guide panel 250 has a frame shape with one side opened corresponding to the light source. The guide panel 250 may be made of a plastic material that can be molded into a mold, such as polycarbonate.

The display panel 100 and the guide panel 250 may be fixed to each other by an adhesive layer 150. The adhesive layer 150 is interposed between the edge of the liquid crystal display panel 100 and the first body 251 of the guide panel 250. The adhesive layer 150 may function to confine and restrict mutual movement of the display panel 100 and the guide panel 250 and may function to buffer an external force.

Figure 5:
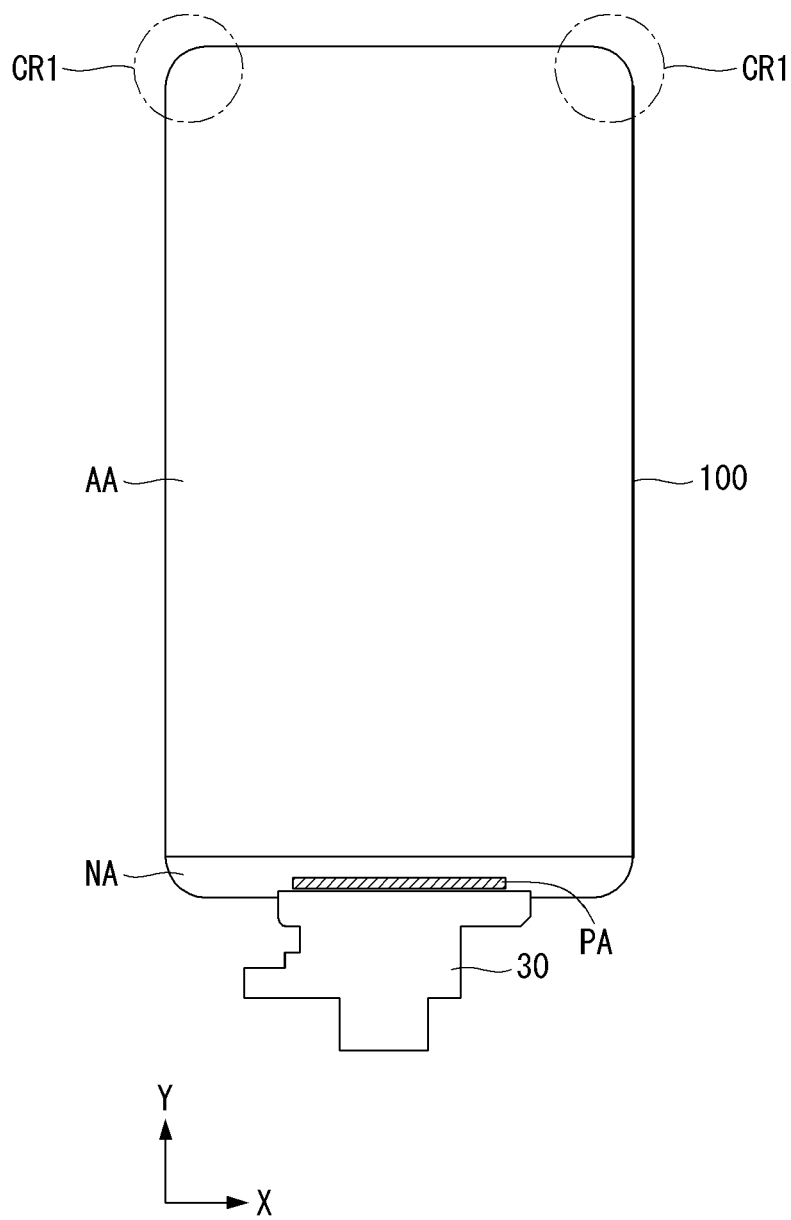
FIG. 5 is a schematic view of a display panel according to an embodiment of the disclosure.
Figure 6:
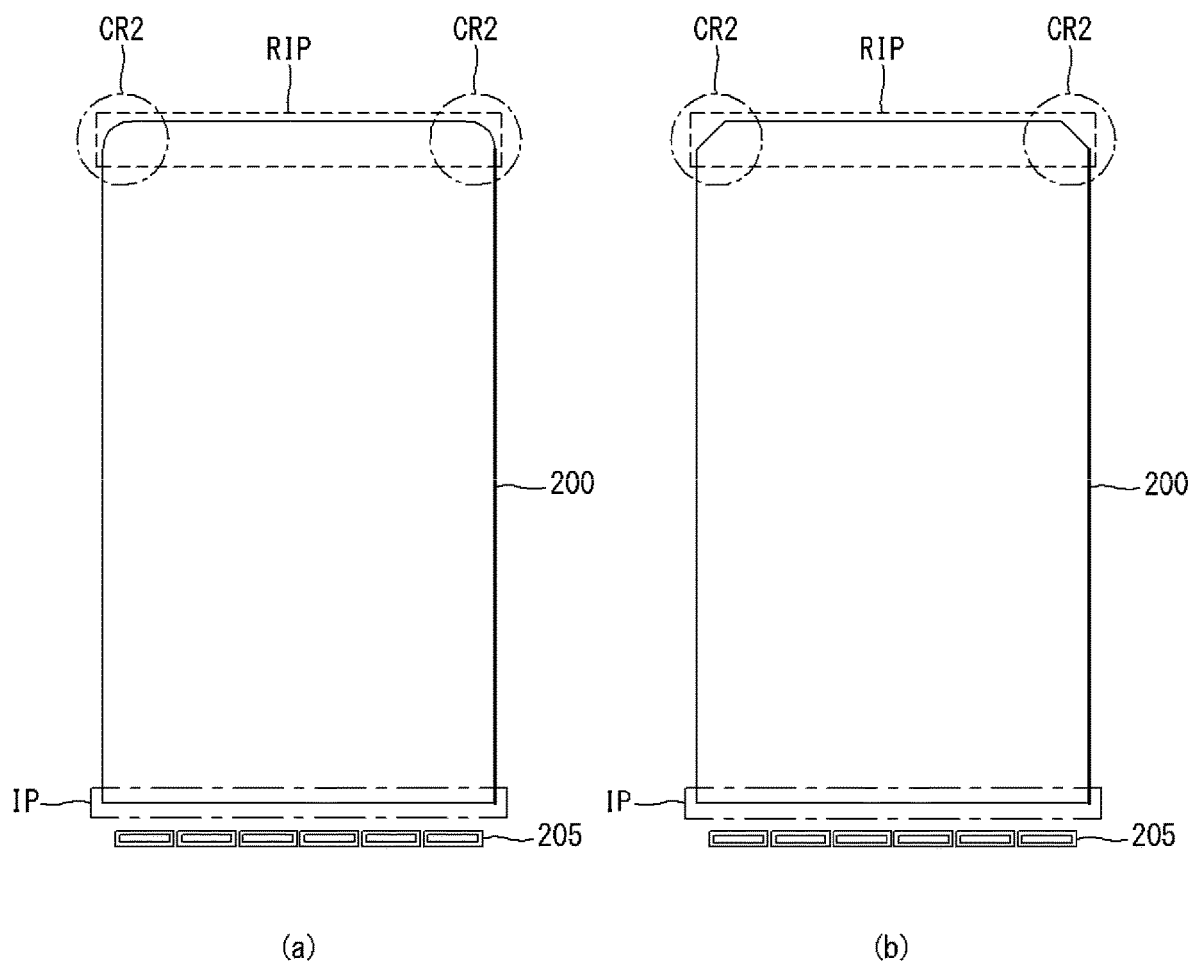
FIG. 6 is a schematic view of a light guide plate according to a first embodiment of the disclosure.
Figure 7:
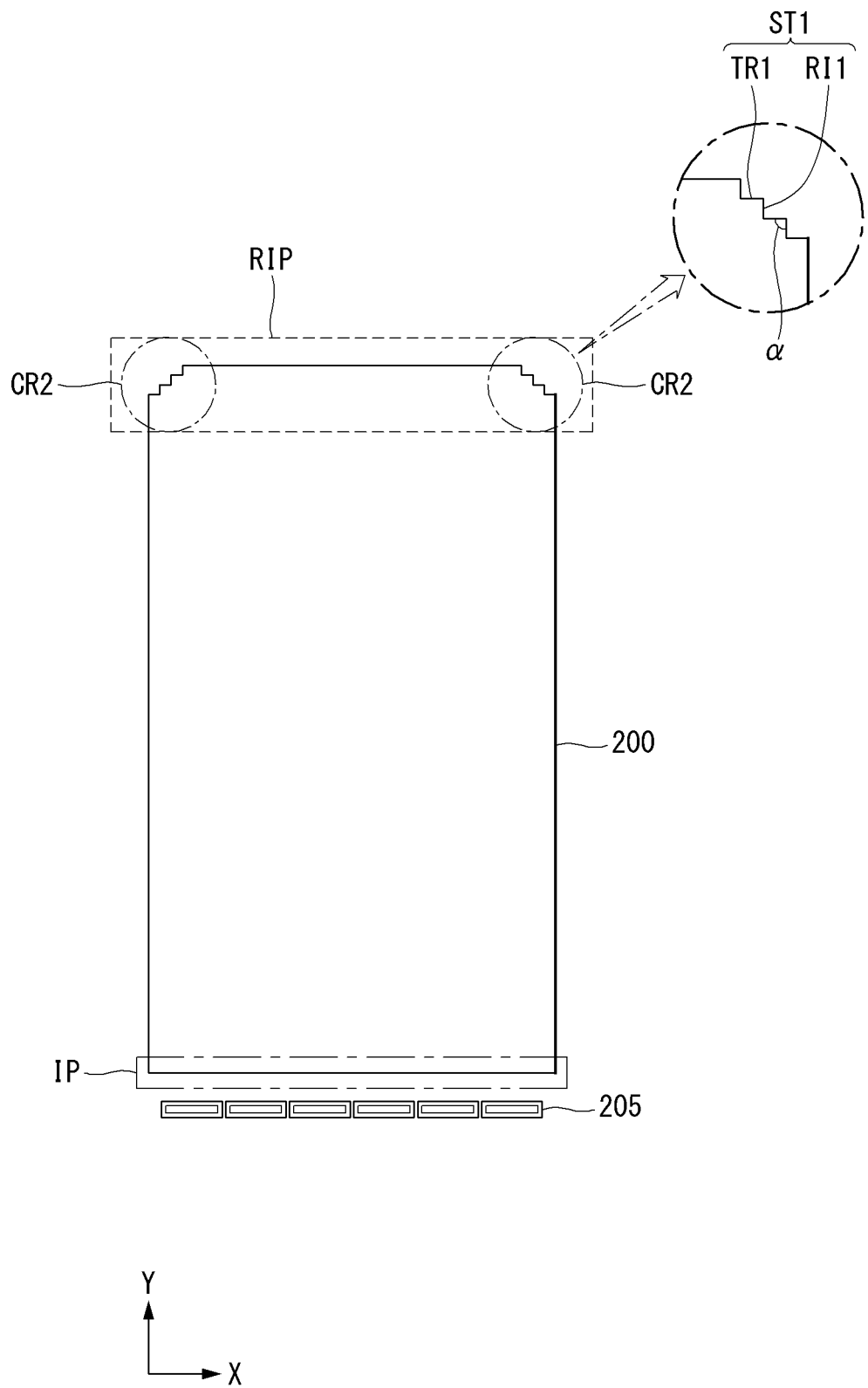
FIG. 7 is a schematic view of a light guide plate according to a second embodiment of the disclosure.
Figure 8:
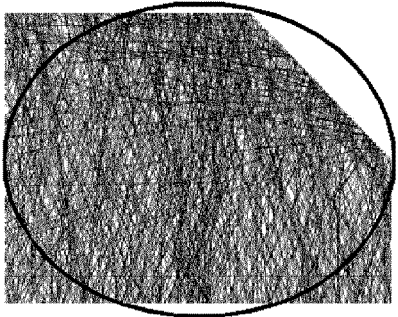
FIG. 8 is a view explaining a comparison between a first embodiment and a second embodiment of the disclosure.
Figure 8:
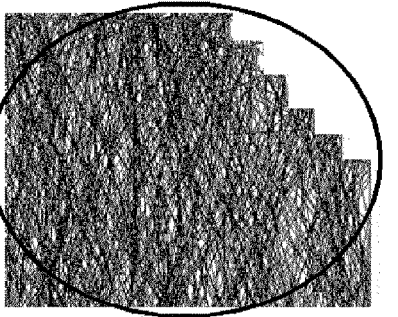
Figure 8:
Figure 8:
Figure 9:
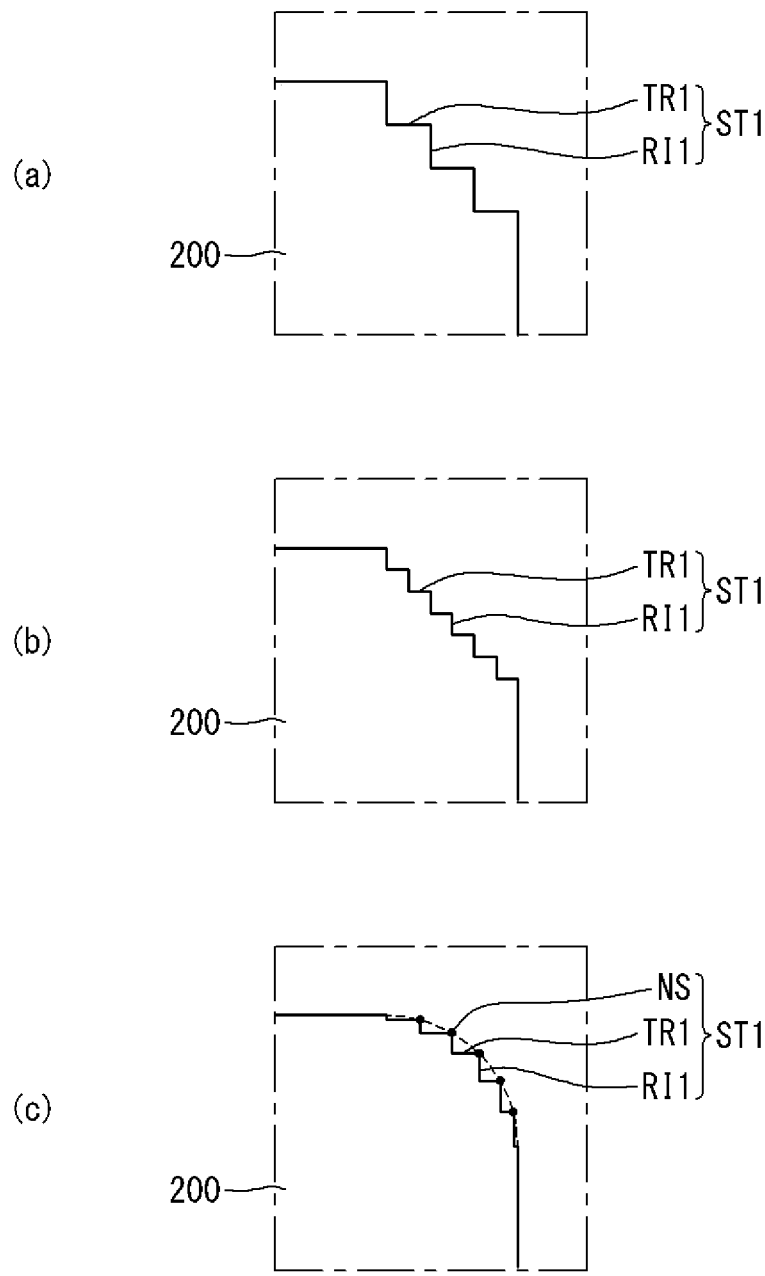
FIG. 9 is a view illustrating an example of a shape of a first step pattern.

FIG. 5 is a schematic view of a display panel according to an embodiment of the disclosure. FIG. 6 is a schematic view of a light guide plate according to a first embodiment of the disclosure. FIG. 7 is a schematic view of a light guide plate according to a second embodiment of the disclosure. FIG. 8 is a view explaining a comparison between a first embodiment and a second embodiment of the disclosure. FIG. 9 is a view illustrating an example of a shape of a first step pattern.

Referring to FIG. 5, a display panel 100 according to an embodiment of the disclosure has an irregular planar shape (or a free form planar shape). That is, the planar shape of the display panel 100 has various planar shapes such as a polygon, a circle, and an ellipse rather than a rectangular shape as in a conventional instance. Accordingly, a corner CR1 of the display panel 100 may have a predetermined or otherwise selected curvature or a chamfered shape.

The liquid crystal display according to an embodiment of the disclosure is provided with the free form display panel 100 so that it has an advantage that it can be applied to a display device in various fields such as TVs, automobile displays, and wearable devices as well as mobile devices such as smart phones and tablet PCs regardless of its shape.

The display panel 100 includes a display area AA and a non-display area NA defined outside the display area AA. The non-display area NA includes a pad area PA. A plurality of sub-pixels are arranged in the display area AA. The sub-pixels may be arranged in the display area AA in a manner of R (red), G (green), B (blue) or R, G, B, W (white) to realize full colors. The sub-pixels may be defined by gate lines and data lines that intersect with each other.

A flexible circuit board 30 includes bumps (or terminals). The bumps of the flexible circuit board 30 may be bonded to pads of the pad area PA through an anisotropic conductive film, respectively.

Referring to FIG. 6, a light guide plate 200 and a light source 205 are disposed on a back surface of the display panel 100. The light source 205 is arranged to face at least one side of the light guide plate 200. The one side surface of the light guide plate 200 facing the light source 205 may be defined as a light incident plane IP, and other side surface of the light guide plate 200 opposing the light-incident plane IP may be defined as a reverse light incident plane RIP. Hereinafter, for convenience of explanation, an instance in which the light source 205 is disposed only on one side of the light guide plate 200 will be described as an example.

Light emitted from the light source 205 is incident on the light guide plate 200. The light incident through the light incoming plane IP of the light guide plate 200 travels through total internal reflection in the light guide plate 200 and at least a part of the light is emitted to outside of the light guide plate 200 toward the display panel 100. The light guide plate 200 may include a predetermined pattern for emitting light toward a front direction. The predetermined pattern may be formed on a front surface of the light guide plate 200, but is not limited thereto.

The light guide plate 200 may have a shape corresponding to the planar shape of the display panel 100. That is, the light guide plate 200 according to the first embodiment of the disclosure may have an irregular planar shape (or a free form planar shape). Accordingly, a corner CR2 of the light guide plate 200 may have a curvature or a chamfered shape. The curvature can be a selected curvature or predetermined curvature that has a selected radius.

When the display panel 100 and the light guide plate 200 do not have corresponding shapes and have different shapes, a bezel area is formed by the deviation. An increase of the bezel area lowers a degree of user's image immersion and causes a deterioration of aesthetic. Therefore, the planar shape of the light guide plate 200 according to the first embodiment of the disclosure is formed to have a shape corresponding to the shape of the display panel 100.

However, the light that is incident on the light incident plane IP and travels toward the reverse light incident plane RIP through total internal reflection is reflected at a corner CR2 of the reverse light incident plane RIP having a curvature or a chamfered shape, and is concentrated in one region adjacent to the corner CR2. That is, when the corner CR2 of the reverse light incident plane RIP has a predetermined curvature or is chamfered, a phenomenon in which the light is locally concentrated in one region corresponding to the shape of the corner CR2 of the reverse light incident plane RIP may occur since the light totally-reflected at the corner CR2 of the reverse light incident plane RIP is not properly dispersed in different directions.

Since a size of the region where the totally-reflected light is locally concentrated is relatively large, the light provided from the light guide plate 200 is not uniformly emitted toward the display panel 100 in the entire region and is concentrated in a specific region. As a result, there arises a problem that luminance uniformity is remarkably lowered, which is recognized as a poor image quality for the user.

Referring to FIG. 7, in order to prevent the above-described problem, a second embodiment of the disclosure forms a plurality of first step patterns ST1 at the corner CR2 of the reverse light incident plane RIP. A first step pattern ST1 includes a first tread TR1 and a first riser RI1. A first included angle between the first tread TR1 and the first riser RI1 have a predetermined angle α. Most preferably, the first included angle is 90°. Light reflected from the first tread TR1 and light reflected from the first riser RI1 among the light totally-reflected at the corner CR2 of the reverse light incident plane RIP may travel in different directions.

The embodiment of the disclosure alternately forms the first tread TR1 and the first riser RI1, which are two inclined surfaces having different angles and provided at the corner CR2 of the reverse light incident plane RIP, so that it is possible to control paths of the lights totally-reflected at the corner CR2 of the reverse light incident plane RIP. The embodiment of the disclosure forms the plurality of first step patterns ST1 at the corner CR2 of the reverse light incident plane RIP, so that it is possible to disperse the lights totally-reflected at the corner CR2 of the reverse light incident plane RIP to be not concentrated in one region.

In addition, the embodiment of the disclosure alternately forms the first tread TR1 and the first riser RI1, which are two inclined surfaces having different angles and provided at the corner CR2 of the reverse light incident plane RIP, so that some light can be prevented from total internal reflection at an interface between the reverse light incident plane RIP and air. Accordingly, it is possible to reduce the concentration of light in a specific region. The embodiment of the disclosure can provide a liquid crystal display which has a free form display panel 100 and a free form light guide plate 200, and remarkably improves the luminance uniformity.

FIG. 8 is a view for explaining a comparison between the first embodiment and the second embodiment, and illustrates ray tracing showing paths of lights at the corner CR2 of the reverse light incident plane RIP and a simulation result according to the ray tracing. Referring to FIG. 8, in the second embodiment as compared with the first embodiment, it can be seen that the light totally-reflected at the corner CR2 of the reverse light incident plane RIP is not excessively concentrated in one region but is appropriately dispersed. In addition, it can be seen that a size of the region where the light reflected at the corner CR2 of the reverse light incident plane RIP is locally concentrated is significantly reduced in the second embodiment as compared with the first embodiment. Therefore, the second embodiment of the disclosure secures the luminance uniformity, so that the second embodiment of the disclosure has an advantage that a liquid crystal display having improved image quality characteristics can be provided.

Referring to FIGS. 9(a) and 9(b), in order to reduce the bezel area, a shape dimension of the first step pattern ST1 can be reduced. That is, it may be desirable that the first tread TR1 and the first riser RI1 have a minimum length if possible in a process.

Referring to FIG. 9(c), in order to reduce the bezel area, the first step patterns ST1 may be formed so that imaginary line connecting a nosing NS of each of first step patterns ST1 forms a curve. The nosing NS means a portion where the first tread TR1 and the first riser RI1 meet in one first step pattern ST1. A curvature of the curve formed by the imaginary line may correspond to the curvature of the corner CR1 of the display panel 100. At this time, a shape dimension of any one first step pattern ST1 may be different from that of other first step pattern ST1. That is, lengths of the first tread TR1 and the first riser RI1 of at least one first step pattern ST1 may be different, lengths of any one first tread TR1 and other one first tread TR1 may be different, and lengths of any one of the first risers RI1 and other one of the first risers RI1 may be different. It is possible to remarkably reduce the bezel area in an instance where the imaginary line connecting the nosing NS of each of the first step patterns ST1 forms a curve in comparison with a straight line.

Figure 10:
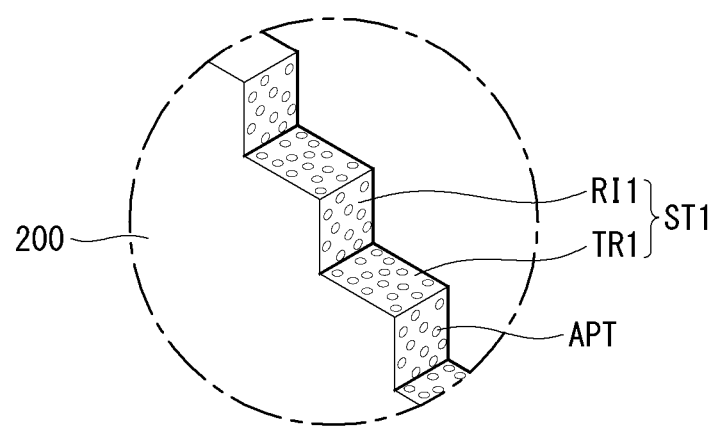
FIG. 10 is a schematic view of a light guide plate according to a third embodiment of the disclosure.

FIG. 10 is a schematic view of a light guide plate according to a third embodiment of the disclosure.

Referring to FIG. 10, the third embodiment of the disclosure may further form an auxiliary pattern APT on at least one of a first tread TR1 and a first riser RI1 formed at a corner CR2 of a reverse light incident plane RIP. The auxiliary pattern APT may be formed with an embossment (or, relief) or an intaglio (or, hollow relief). The auxiliary pattern APT may have a dot shape or a cone shape, but is not limited thereto.

The auxiliary pattern APT can convert (or control) a path of light totally reflected at the corner CR2 of the reverse light incident plane RIP. Alternatively, the auxiliary pattern APT may prevent at least some light from being totally-reflected from an interface between the first tread TR1 and air and/or at an interface between the first riser RI1 and air. Accordingly, the third embodiment of the disclosure can provide a liquid crystal display securing luminance uniformity by minimizing the concentration of light in a specific region.

Figure 11:
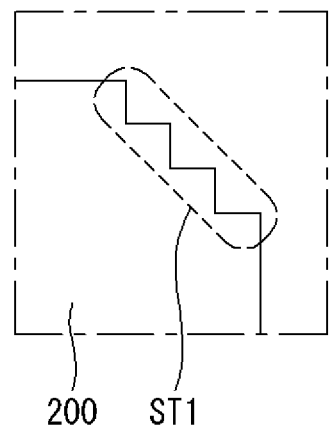
FIG. 11 is a schematic view of a light guide plate according to a fourth embodiment of the disclosure.
Figure 11:
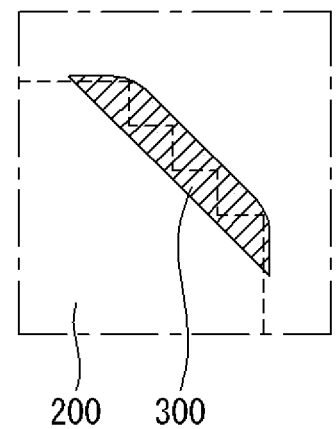

FIG. 11 is a schematic view of a light guide plate according to a fourth embodiment of the disclosure.

Referring to FIG. 11, a light guide plate 200 according to the fourth embodiment of the disclosure includes a first step pattern ST1 formed at a corner CR2 of a reverse light incident plane RIP and a light shielding member 300 covering the first step pattern ST1 from above.

As described above, although the embodiment of the disclosure can remarkably reduce the size of the region where the total reflected light is concentrated by forming the first step pattern ST1 at the corner CR2 of the reverse light incident plane RIP, it is difficult to completely remove the region. That is, the region where the light is concentrated may remain along a shape of the first step pattern ST1 at an end of the reverse light incident plane RIP.

The fourth embodiment of the disclosure includes the light shielding member 300 in order to prevent the light from being concentrated in one region and emitted along the first step pattern ST1. The light shielding member 300 is disposed on an upper side of the first step pattern ST1 and can shield the first step pattern ST1. The light shielding member 300 may be a light shielding tape, but is not limited thereto. The fourth embodiment of the disclosure has an advantage that luminance unevenness can be remarkably improved.

Although not shown, the light guide plate 200 may have a predetermined emission pattern for emitting light traveling in the light guide plate 200 through total internal reflection to outside of the light guide plate 200. The emission pattern may be provided on a front surface and/or a back surface of the light guide plate 200.

The fourth embodiment of the disclosure can form a density of the emission pattern differently depending on a position in order to prevent the light from being concentrated in one region and excessively emitted along the first step pattern ST1. That is, the density of the emission pattern may be different in a first region where the light is concentrated and a relatively large amount of the light is emitted, and a second region which is the other region. The density of the emission pattern in the first region is lower than the density of the emission pattern in the second region. Positions of the first region and the second region can be selected by analyzing a degree of light emission at a position adjacent to the first step pattern ST1.

Figure 12:
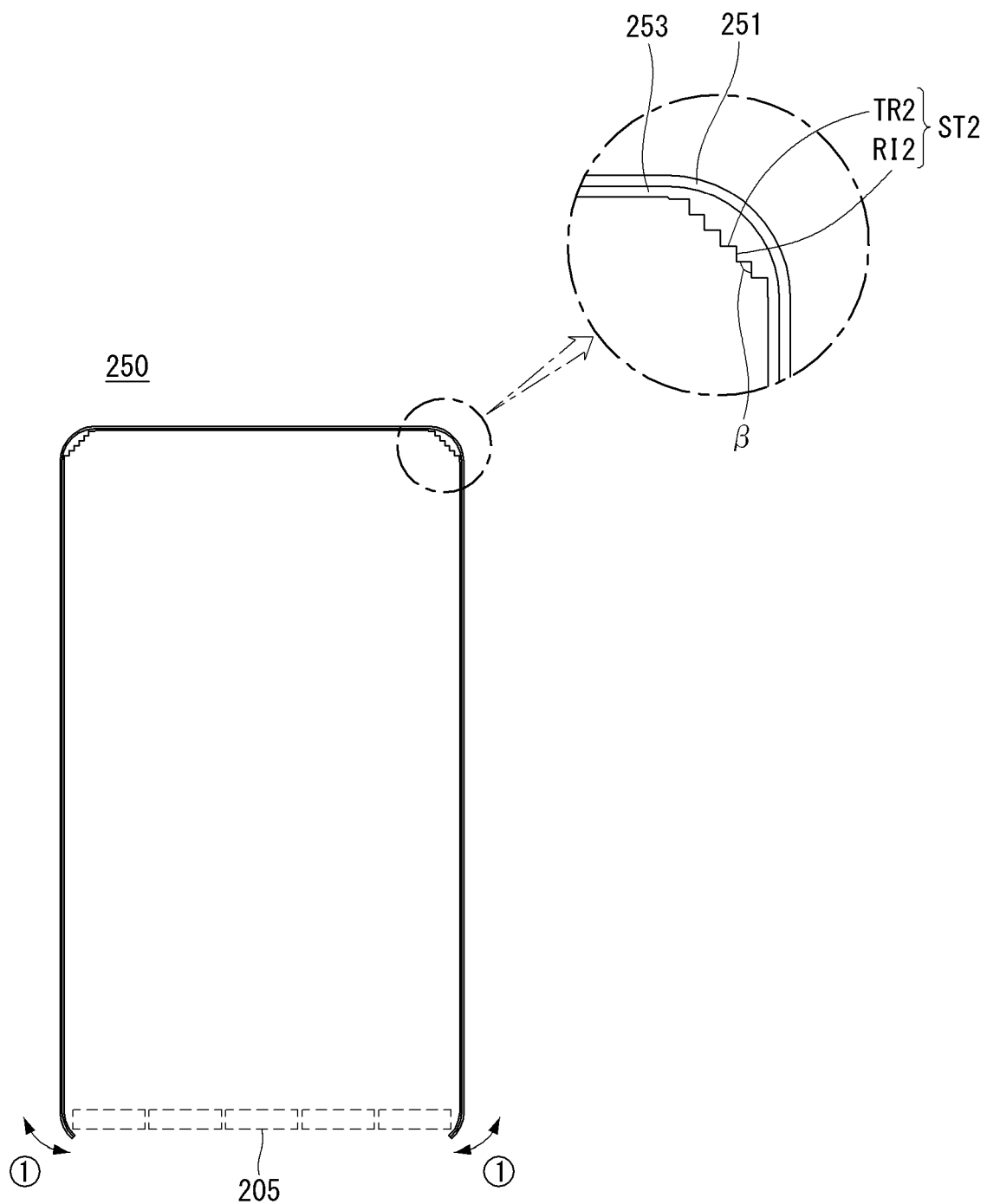
FIG. 12 is a schematic view of a guide panel according to an embodiment of the disclosure.
Figure 13:
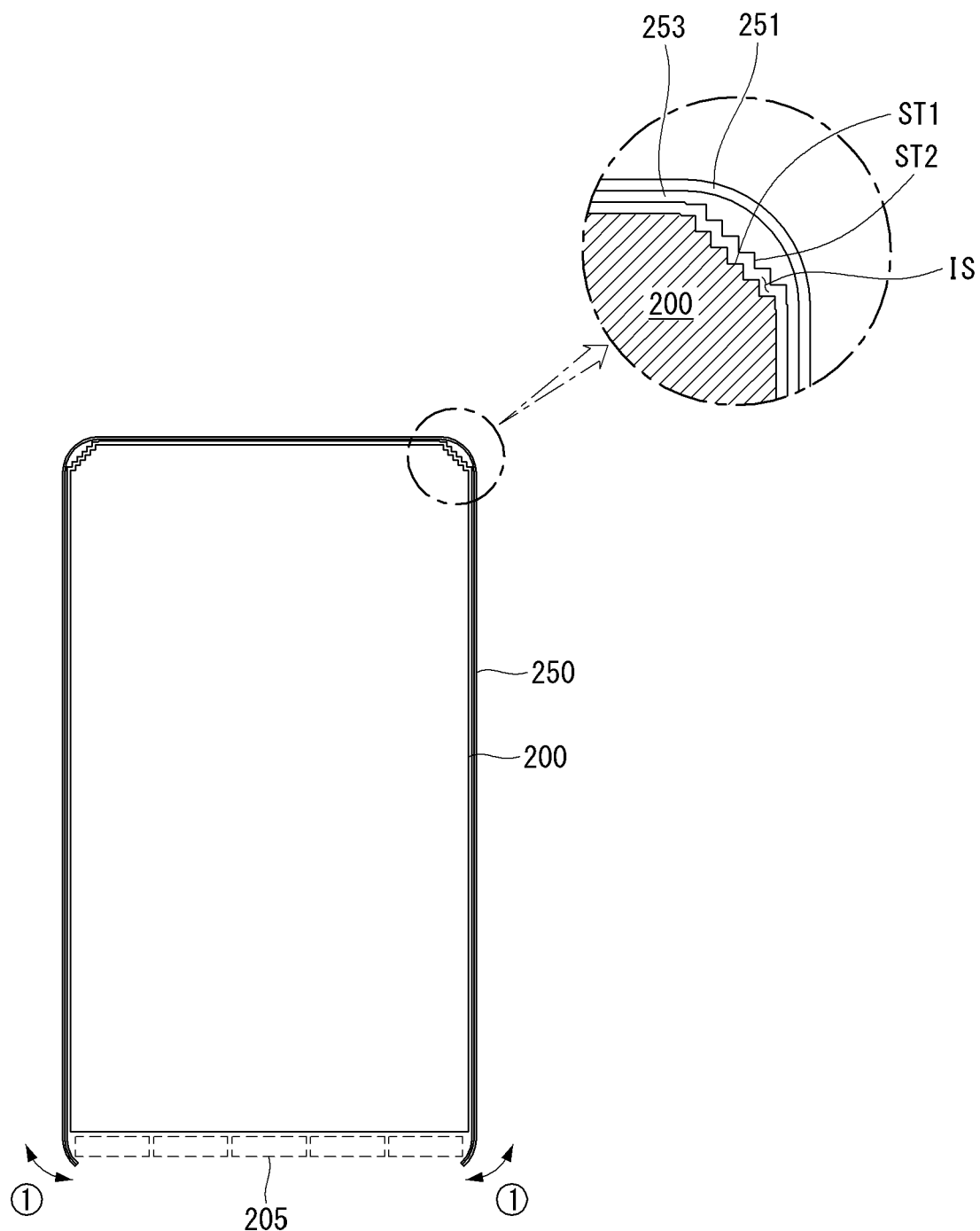
FIG. 13 is a view explaining relationship between a guide panel and a light guide plate according to an embodiment of the disclosure.

FIG. 12 is a schematic view of a guide panel according to an embodiment of the disclosure. FIG. 13 is a view explaining relationship between a guide panel and a light guide plate according to an embodiment of the disclosure.

Referring to FIG. 12, a guide panel 250 according to an embodiment of the disclosure has a frame shape passing through a center and having one side opened. The one side of the open guide panel 250 is a surface corresponding to a light incident plane IP of a light guide plate 200. That is, the one side of the open guide panel 250 is a surface facing a light source 205. Thus, the guide panel 250 may be composed of three sides, and two corners respectively connecting the two adjacent sides among the three sides.

The embodiment of the disclosure removes the one side of the guide panel 250, so that an area occupied by the guide panel 250 in a liquid crystal display can be minimized. Accordingly, the embodiment of the disclosure has an advantage that a liquid crystal display in which a bezel area is minimized can be provided.

However, when the one side of the guide panel 250 is opened, movement (①) of two neighboring sides of the one side can be relatively free. Therefore, due to the movement (①) of the two neighboring sides of the guide panel 250, stress can be concentrated on the two corners connecting the three sides of the guide panel 250. That is, the two corners of the guide panel 250 may be vulnerable to cracks.

The embodiment of the disclosure can secure a sufficient thickness by reinforcing a material at the two corners of the guide panel 250 to prevent the above-described problems. That is, at least one of the two corners of the guide panel 250 has a thicker thickness than other portions of the guide panel 250. Accordingly, the embodiment of the disclosure can reinforce rigidity of the guide panel 250, thereby providing a liquid crystal display having a robust structure.

Referring to FIG. 13, since the light guide plate 200 according to the embodiment of the disclosure has a free form corner shape, a part of an empty internal space IS is provided between a corner CR2 of the light guide plate 200 and the corner of the guide panel 250. The reinforcement of the thickness at the corner of the guide panel 250 can be realized by adding the material to the guide panel 250 in the internal space IS. The material can be added to a second body 253 of the guide panel 250 facing the light guide plate 200. Accordingly, the embodiment of the disclosure has an advantage that the rigidity of the guide panel 250 can be secured without changing an overall shape of the liquid crystal display.

The second body 253 includes a plurality of second step patterns ST2 having a second tread TR2 and a second riser RI2. A second included angle between the second tread TR2 and the second riser RI2 have a predetermined angle β.

The second step patterns ST2 of the second body 253 and the first step patterns ST1 of the light guide plate 200 may be arranged to be engaged with each other. The second tread TR2 is arranged opposite the first tread TR1, and the second riser RI2 is arranged opposite the first riser RI1. Also, the first included angle α and the second included angle β may be substantially the same.

The first step patterns ST1 of the light guide plate 200 and the second step patterns ST2 of the guide panel 250 are arranged to be engaged with each other, so that the mutual movement of the light guide plate 200 and the guide panel 250 can be constrained and restricted. Accordingly, the embodiment of the disclosure can provide a liquid crystal display having a rigid fastening structure.

Modified Example

Figure 14:
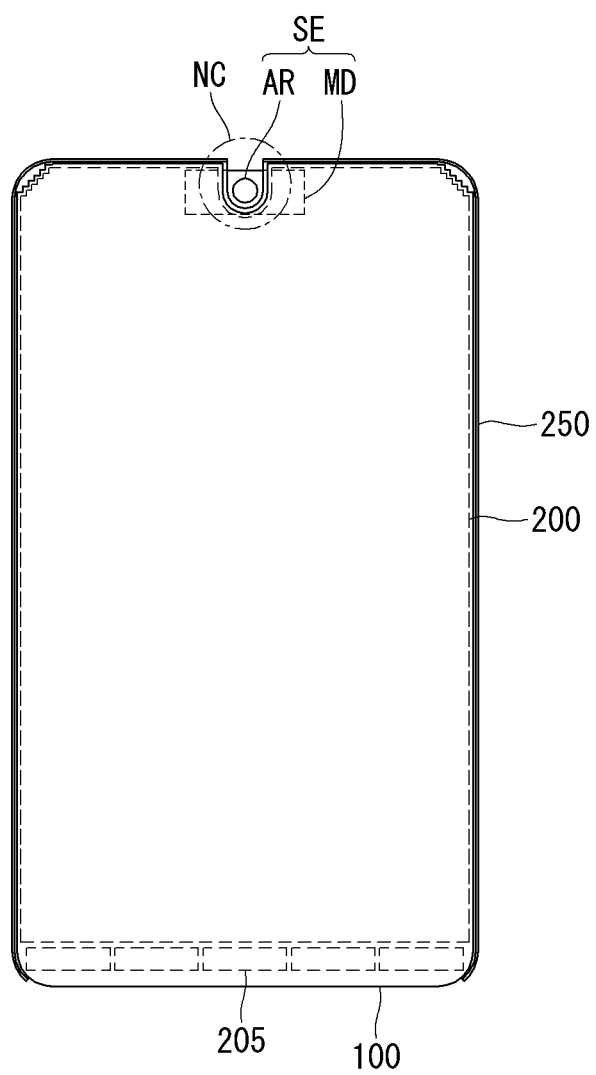
FIG. 14 is a view schematically illustrating a liquid crystal display according to a modified example of the disclosure.
Figure 15:
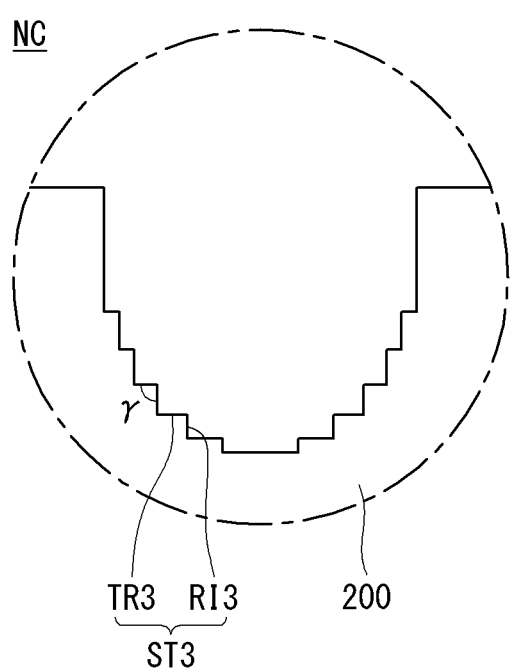
FIG. 15 is an enlarged view of a notch portion of a light guide plate.
Figure 16:
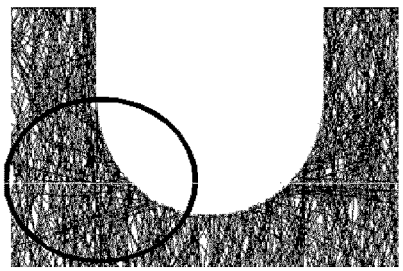
FIG. 16 is a view explaining an effect according to a modified example of the disclosure.
Figure 16:
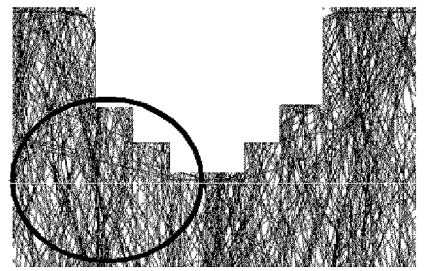
Figure 16:
Figure 16:

Hereinafter, referring to FIGS. 14 to 16, a liquid crystal display according to a modified example of the disclosure will be described. FIG. 14 is a view schematically illustrating a liquid crystal display according to a modified example of the disclosure. FIG. 15 is an enlarged view of a notch portion of a light guide plate. FIG. 16 is a view explaining an effect according to a modified example of the disclosure.

Referring to FIG. 14, a liquid crystal display according to a modified example of the disclosure includes a liquid crystal module and an optical sensor SE. The liquid crystal module includes a display panel 100 and a backlight unit. The backlight unit includes a light guide plate 200 disposed below the display panel 100, and a light source 205 disposed on at least one side of the light guide plate 200.

The optical sensor SE performs an auxiliary function of the liquid crystal display under the liquid crystal module.

The optical sensor SE may be a camera (or an image sensor) or an illuminance sensor, but is not limited thereto.

The display panel 100 and the light guide plate 200 include a notch portion NC. The notch portion NC is a region opened in the liquid crystal module and exposes a part of the optical sensor SE disposed under the liquid crystal module. The notch portion NC has a free form planar shape. That is, the notch portion NC of the display panel 100 may have a predetermined curvature or a chamfered shape, and the notch portion NC of the light guide plate 200 may have a predetermined curvature or a chamfered shape.

The notch portions NC of the display panel 100 and the light guide plate 200 are overlapped with the part of the optical sensor SE. An exposure portion AR of the optical sensor SE overlapping the notch portion NC may be a lens (i.e., a light receiving portion or light interception potion) of the camera or one portion (i.e., a light receiving portion or light interception potion) of the illuminance sensor. Since the exposure portion AR of the optical sensor SE overlaps the notch portion NC, a path of light is not disturbed and the function can be performed.

The notch portion NC may be formed at a center of the light guide plate 200 at a position corresponding to a reverse light incident plane RIP of the light guide plate 200. Therefore, the embodiment of the disclosure can determine a shape of a free form display panel 100 without depending on a position of the notch portion NC for exposing the exposure portion AR of the optical sensor SE.

Since the notch portion NC corresponds to a non-display area in which an input image is not displayed, an increase in an area of the notch portion NC means an increase in a bezel area. As described above, the modified example of the disclosure can minimize the area occupied by the notch portion NC by forming the notch portion NC so as to expose only the part of the optical sensor SE. Specifically, in the modified example of the disclosure, most of a sensor housing MD occupying a relatively large accommodating space is shielded by the liquid crystal module, and only the exposure portion AR, which is provided in a part of the sensor housing MD and in which a light path needs to be secured, is exposed through the notch portion NC, so that the area of the notch portion NC can be minimized. Accordingly, the modified example of the disclosure can provide a liquid crystal display having the optical sensor SE and minimizing the bezel area.

Referring to FIG. 15, light that is incident on a light incident plane IP and travels toward the notch portion NC through total internal reflection is totally-reflected from a notch surface having a predetermined curvature, and can be concentrated in one region adjacent to the notch surface. The notch surface means a side surface of the light guide plate 200 corresponding to the notch portion NC among the reverse light incident plane RIP.

In the modified example of the disclosure, a plurality of third step patterns ST3 may be further formed on the notch surface of the light guide plate 200 in order to prevent a problem that light is concentrated in a specific region. A third step pattern ST3 includes a third tread TR3 and a third riser RI3. A third included angle between the third tread TR3 and the third riser RI3 have a predetermined angle γ. It may be most preferable that the third included angle γ is 90°. Light reflected from the third tread TR3 and light reflected from the third riser RI3 among the light totally-reflected from the notch surface may travel in different directions.

In the modified example according to the disclosure, the third tread TR3 and the third riser RI3, which are two inclined surfaces having different angles on the notch surface, are alternately formed, so that a path of the light totally-reflected from the notch surface can be controlled. The modified example of the disclosure forms the plurality of third step patterns ST3 on the notch surface, so that the modified example of the disclosure can disperse the lights totally-reflected from the notch surface so as not to concentrate in one region.

Further, in the modified example of the disclosure, the third tread TR3 and the third riser RI3, which are two inclined surfaces having different angles on the notch surface, are alternately formed, so that it is possible to prevent some light from being totally reflected from an interface between the third tread TR3 and air and/or an interface between the third riser RI3 and air. Accordingly, it is possible to reduce concentration of light in a specific region. The modified example of the disclosure can provide a liquid crystal display having the light guide plate 200 having the notch portion NC, and remarkably improving luminance uniformity.

FIG. 16 is a view explaining a comparison between a comparative example and a modified example, and illustrates ray tracing showing paths of lights on a notch surface, and a simulation result according to the ray tracing Referring to FIG. 16, in the modified example as compared with the comparative example, it can be seen that the light totally reflected from the notch surface is not excessively concentrated in one region but is appropriately dispersed. In addition, it can be seen that a size of the region where the light totally reflected from the notch surface is locally concentrated is significantly reduced in the modified example as compared with the comparative example. Therefore, the modified example of the disclosure secures luminance uniformity so that the modified example of the disclosure has an advantage that a liquid crystal display having improved image quality characteristics can be provided.

The liquid crystal display according to an embodiment of the disclosure is provided with a free form display panel and a free form light guide plate, so that it has an advantage that it can be applied to a display device in various fields such as TVs, automobile displays, and wearable devices as well as mobile devices such as smart phones and tablet PCs regardless of its shape.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheetare incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A light guide plate, comprising:
a light incident plane on which light provided from a light source is incident;
a reverse light incident plane spaced from and facing the light incident plane, the reverse light incident plane having at least one corner;
the at least one corner of the reverse light incident plane having at least one of a curvature, a chamfered shape, and a step pattern, each step including a tread and a riser; and
an auxiliary pattern having at least one of either an embossment or an intaglio formed on the at least one of the curvature, chamfered shape, tread or the riser.

2. A display, comprising:
a display panel having a first corner having at least one of either a curve having a first selected curvature or a chamfered edge having a first constant slope;
a light guide plate positioned under the display panel and positioned to emit light to pass through the display panel;
a light incident plane on which light is incident from a light source being positioned at a first side of the light guide plate; and
a reverse light incident plane being positioned at a second side of the light guide plate, the second side opposing the light incident plane, the reverse light incident plane having a first corner that is under the first corner of the display panel;
wherein the first corner of the reverse light incident plane has at least one of the second selected curvature, a chamfered shape having a second constant slope or a plurality of step patterns, each step pattern including a tread and a riser, and the first selected curvature and the second selected curvature have the same curvature, and the first constant slope and the second constant slope have the same slope,
wherein the plurality of step patterns is a first plurality of step patterns and each tread and riser in the step pattern is a first tread and a first riser, respectively;
a nosing is positioned at the location where the tread and riser meet,
wherein a curvature of an arc formed by a curved line that passes through the nosing of each of the steps has the same curvature as the first and second selected curvatures.

3. The liquid crystal display of claim 2, further comprising:
a guide panel including:
a first body supporting the display panel from below; and
a second body extending from the first body to surround the light guide plate,
wherein the guide panel is open in one side corresponding to the light incident plane and is composed of three sides and two corners connecting the three sides.

4. The liquid crystal display of claim 3, wherein at least one of the two corners of the guide panel has a thicker thickness than other portions of the guide panel.

5. The liquid crystal display of claim 3, wherein the second body includes a plurality of second step patterns including a second tread and a second riser, and wherein the plurality of second step patterns are engaged with the plurality of first step patterns.

6. The liquid crystal display of claim 3, wherein the first body is thicker than the second body.

7. The liquid crystal display of claim 2, further comprising:
an optical sensor disposed under the light guide plate, having a sensor housing and an exposure portion provided in a part of the sensor housing,
wherein the display panel and the light guide plate each include a notch portion exposing the exposure portion.

8. The liquid crystal display of claim 7, wherein the notch portion is provided in a center of the display panel and the light guide plate at a position corresponding to the reverse light incident plane.

9. The liquid crystal display of claim 8, wherein the notch portion of the display panel has a curvature, a chamfered shape, and
wherein the notch portion of the light guide plate has a at least one of a curvature, a chamfered shape, and a plurality of third step patterns including a third tread and a third riser.

10. The liquid crystal display of claim 2 wherein the first corner of the of the reverse light incident plane is not directly under the first corner of the display panel.

11. The liquid crystal display of claim 2, wherein an angle between the first tread and the first riser is 90°.

12. The liquid crystal display of claim 2, wherein the first tread and the first riser have different lengths from each other.

13. The liquid crystal display of claim 2, wherein the first tread of step patterns and the first tread of at least one other of the first step patterns have different lengths.

14. The liquid crystal display of claim 2, wherein the first riser of at least one of the first step patterns and the first riser of at least one other of the first step patterns have different lengths.

15. The liquid crystal display of claim 2, further comprising a light shielding member disposed on an upper side of the first step patterns.

16. The liquid crystal display of claim 2, further comprising:
an emission pattern emitting the light incident from the light source to a front surface of the light guide plate, and
a first region and a second region in which densities of the emission pattern are different,
wherein the first region and the second region are defined in a region adjacent to the corners of the reverse light incident plane.

17. A display, comprising:
a display panel;
a light guide plate positioned under the display panel and positioned to emit light to pass through the display panel;
a light incident plane on which light is incident from a light source being positioned at a first side of the light guide plate;
a reverse light incident plane being positioned at a second side of the light guide plate, the second side opposing the light incident plane, the reverse light incident plane having a first corner, wherein the first corner of the reverse light incident plane has at least one of a selected curvature, a chamfered shape having a constant slope or a plurality of first step patterns, each first step patterns including a tread and a riser;

a guide panel including a first body and a second body extending from the first body, the first body supporting the display panel from below, the second body surrounding the light guide plate; and an auxiliary pattern having at least one of either an embossment or an intaglio formed on the at least one of the selected curvature, chamfered shape, tread or the riser, wherein the second body includes a plurality of second step patterns including a second tread and a second riser, and wherein the plurality of second step patterns are engaged with the plurality of first step patterns.

\* \* \* \* \*